(12) United States Patent
Kim et al.

(10) Patent No.: US 10,720,279 B2
(45) Date of Patent: Jul. 21, 2020

(54) MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Bum Soo Kim, Suwon-si (KR); Jang Yeol Lee, Suwon-si (KR); Jong Ho Lee, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 75 days.

(21) Appl. No.: 16/179,528

(22) Filed: Nov. 2, 2018

(65) Prior Publication Data

US 2020/0082983 A1 Mar. 12, 2020

(30) Foreign Application Priority Data

Sep. 6, 2018 (KR) .......................... 10-2018-0106636

(51) Int. Cl.
*H01G 4/232* (2006.01)
*H01G 4/30* (2006.01)
(Continued)

(52) U.S. Cl.
CPC ............. *H01G 4/232* (2013.01); *H01G 4/012* (2013.01); *H01G 4/30* (2013.01); *H01G 4/1227* (2013.01); *H01G 4/1245* (2013.01)

(58) Field of Classification Search
CPC ........... H01G 4/30; H01G 4/228; H01G 4/232
See application file for complete search history.

(56) References Cited

U.S. PATENT DOCUMENTS

2009/0284896 A1 11/2009 Sakaguchi et al.
2014/0182907 A1* 7/2014 Lee ........................ H05K 1/162
174/258

(Continued)

FOREIGN PATENT DOCUMENTS

JP 2012-199597 A 10/2012
JP 5217584 B2 6/2013
(Continued)

OTHER PUBLICATIONS

Office Action issued in corresponding Korean Patent Application No. 10-2018-0106636 dated Jul. 12, 2019.

*Primary Examiner* — Eric W Thomas
(74) *Attorney, Agent, or Firm* — Morgan, Lewis & Bockius LLP (57) ABSTRACT

A multilayer ceramic electronic component includes a ceramic body including a dielectric layer and a plurality of internal electrodes disposed to face each other with the dielectric layer interposed therebetween and external electrodes disposed on external surfaces of the ceramic body and electrically connected to the internal electrodes, respectively. The external electrode includes electrode layers electrically connected to the internal electrodes, and plating layers disposed on the electrode layers. At least one point, at which slopes of tangent lines of one of the electrode layers and the plating layers are opposite to each other, is disposed in a region within a range of ±0.2 BW around a point (0.5 BW) that is a halfway point of an overall width BW of the electrode layers disposed on the first surface or the second surface of the ceramic body.

19 Claims, 3 Drawing Sheets

(51) Int. Cl.
*H01G 4/012* (2006.01)
*H01G 4/12* (2006.01)

(56) References Cited

U.S. PATENT DOCUMENTS

| | | |
|---|---|---|
| 2015/0043124 A1 | 2/2015 | Kim et al. |
| 2016/0233027 A1* | 8/2016 | Iijima .................... H01G 4/232 |
| 2017/0018361 A1 | 1/2017 | Nishisaka |
| 2018/0108482 A1 | 4/2018 | Kogure et al. |

FOREIGN PATENT DOCUMENTS

| | | |
|---|---|---|
| JP | 5930045 B2 | 6/2016 |
| JP | 2017-22365 A | 1/2017 |
| KR | 10-1444615 B1 | 9/2014 |
| KR | 10-2018-0042125 A | 4/2018 |

\* cited by examiner

MULTILAYER CERAMIC ELECTRONIC COMPONENT

CROSS-REFERENCE TO RELATED APPLICATION(S)

This application claims benefit of priority to Korean Patent Application No. 10-2018-0106636 filed on Sep. 6, 2018 in the Korean Intellectual Property Office, the disclosure of which is incorporated herein by reference in its entirety.

TECHNICAL FIELD

The present disclosure relates to a multilayer ceramic electronic component, and more particularly, to a method of fabricating a multilayer ceramic electronic component having excellent reliability.

BACKGROUND

In general, an electronic component using a ceramic material, such as a capacitor, an inductor, a piezoelectric element, a varistor, a thermistor, or the like, includes a ceramic body formed of a ceramic material, internal electrodes provided inside the ceramic body, and external electrodes provided on surfaces of the ceramic body and respectively connected to the internal electrodes.

Among multilayer ceramic electronic components, a multilayer ceramic capacitor includes a plurality of laminated dielectric layers, internal electrodes disposed to oppose each other with the dielectric layer interposed therebetween, and external electrodes electrically connected to internal electrodes.

Multilayer ceramic capacitors have been widely used as components in mobile communications devices such as computers, personal data assistants (PDAs), mobile phones, and the like, due to advantages thereof such as compactness, high capacitance, ease of mounting, and the like.

With the recent trend toward high performance and lightweight, thinness, shortness, and small size of electronic devices, electronic components have also been required to have a small size, high performance, and ultrahigh capacitance.

According to high capacitance and miniaturization of a multilayer ceramic capacitor, there is need for a technique to significantly increase capacitance per unit volume.

In the case of an internal electrode, high capacitance should be implemented by increasing the number of laminations, achieved by significantly decreasing the volume of the internal electrode while significantly increasing an area of the internal electrode.

Due to high capacitance and miniaturization of a multilayer ceramic capacitor, securing reliability, in detail, moisture-resistance reliability is becoming an important issue.

SUMMARY

An aspect of the present disclosure is to provide a multilayer ceramic electronic component and a method of fabricating a multilayer ceramic electronic component having excellent reliability.

According to an aspect of the present disclosure, a multilayer ceramic electronic component includes a ceramic body including a dielectric layer and a plurality of internal electrodes disposed to oppose each other with the dielectric layer interposed therebetween, the ceramic body having a first surface and a second surface disposed to face each other in a first direction, a third surface and a fourth surface connected to the first surface and the second surface and opposing each other in a second direction, and a fifth surface and a sixth surface connected to the first surface to the fourth surface and opposing each other in a third direction, and an external electrode disposed on external surfaces of the ceramic body and electrically connected to the internal electrodes. The external electrode includes electrode layers electrically connected to the internal electrodes and plating layers disposed on the electrode layers, and the electrode layers and the plating layers extend to the first surface and the second surface of the ceramic body. At least one point, at which slopes of tangent lines of one of the electrode layers and the plating layers are opposite to each other, is disposed in a region within a range of ±0.2 BW around a point (0.5 BW) that is a halfway point of an overall width BW of the electrode layers disposed on the first surface or the second surface of the ceramic body.

According to an aspect of the present disclosure, a multilayer ceramic electronic component includes a ceramic body including dielectric layers and first and second internal electrodes disposed to face each other with the dielectric layers interposed therebetween, the ceramic body having a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and an external electrode including a first electrode layer in contact with the first internal electrodes, a second electrode layer disposed on the first electrode layer and exposing an end portion of the first electrode layer, and first and second plating layers disposed on the first and second electrode layers. The first and second electrode layers and the first and second plating layers extend from the third surface to the first surface and the second surface of the ceramic body, and at least one of the first electrode layer and the first and second plating layers has a dimple in a region within a range of ±0.2 BW, in the second direction, around a point (0.5 BW) that is a halfway point of an overall width BW, in the second direction, of the first electrode layer disposed on the first surface or the second surface of the ceramic body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments in the present disclosure will be described in detail, with reference to the accompanying drawings, where those components are rendered using the same reference number that are the same or are in correspondence, regardless of the figure number, and redundant explanations are omitted.

An exemplary embodiment in the present disclosure relates to a ceramic electronic component. An electronic component using a ceramic material may be a capacitor, an inductor, a piezoelectric component, a varistor, a thermistor, or the like. Below, a multilayer ceramic capacitor will be described as an example of the ceramic electronic component.

Figure 1:
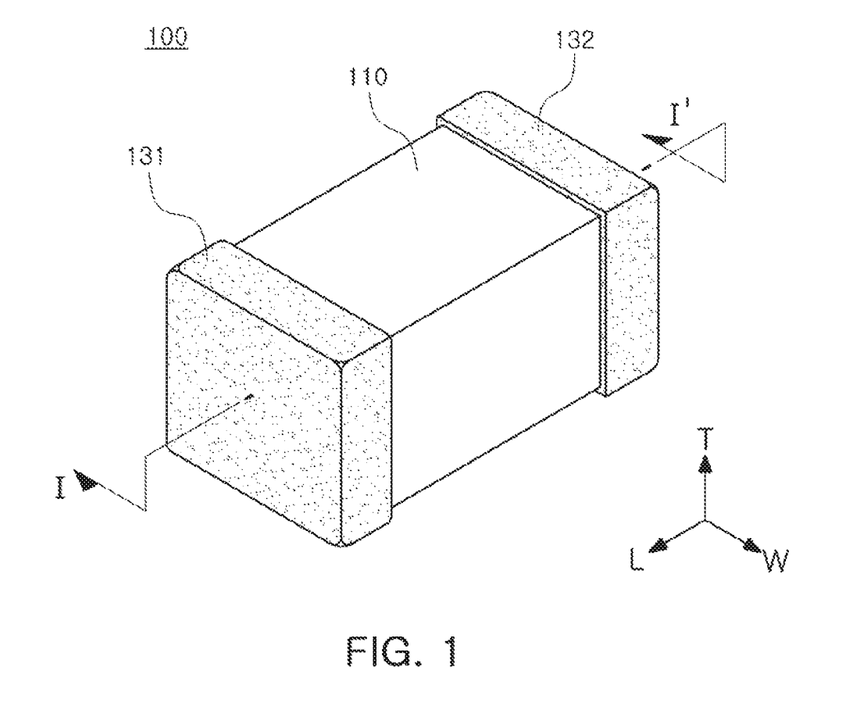
FIG. 1 is a perspective view of a multilayer ceramic capacitor according to an exemplary embodiment in the present disclosure.

FIG. 1 is a perspective view of a multilayer ceramic capacitor according to an exemplary embodiment in the present disclosure.

Figure 2:
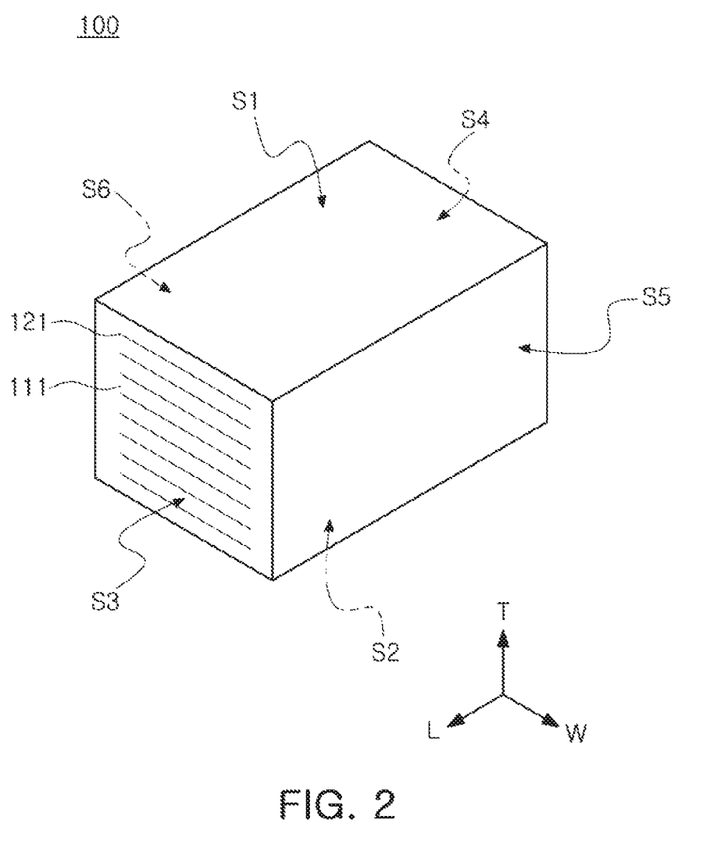
FIG. 2 is a perspective view illustrating an appearance of a ceramic body according to an exemplary embodiment in the present disclosure.

FIG. 2 is a perspective view illustrating an appearance of a ceramic body according to an exemplary embodiment in the present disclosure.

Figure 3:
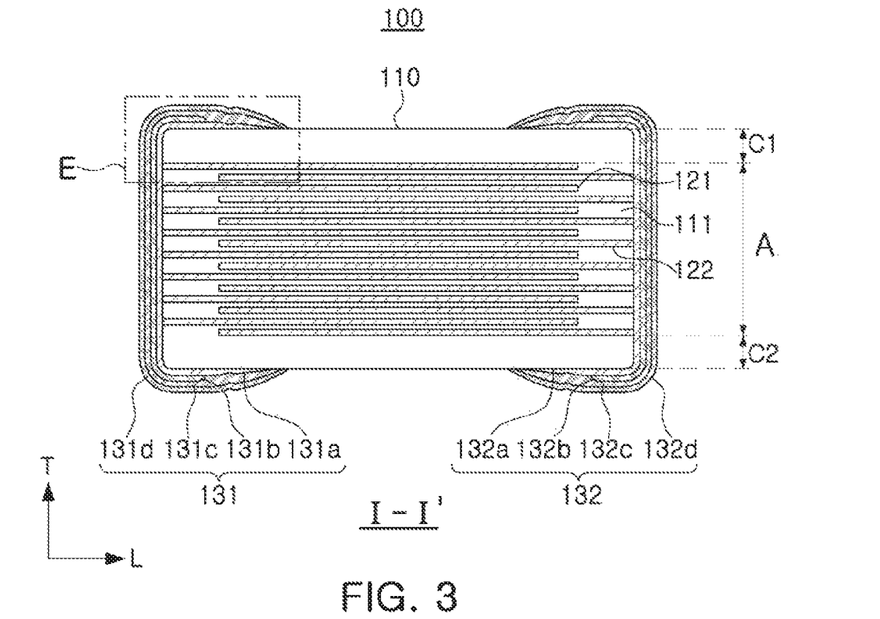
FIG. 3 is a cross-sectional view taken along line I-I' in FIG. 1.

FIG. 3 is a cross-sectional view taken along line I-I' in FIG. 1.

Figure 4:
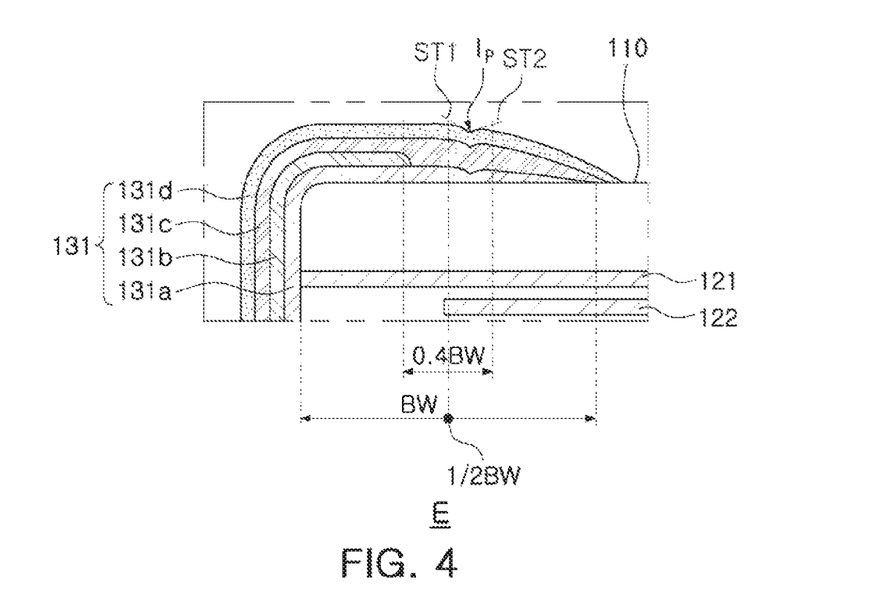
FIG. 4 is an enlarged view of region "E" in FIG. 3.

FIG. 4 is an enlarged view of region "E" in FIG. 3.

Referring to FIGS. 1 to 4, a multilayer ceramic capacitor 100 according to an exemplary embodiment includes a ceramic body 110, internal electrodes 121 and 122 disposed inside the ceramic body 110, and external electrodes 131 and 132 disposed on an external surface of the ceramic body 110.

In FIG. 1, a 'length direction' of the multilayer ceramic capacitor 100 may be defined as an 'L' direction, a 'width direction' thereof may be defined as a 'W' direction, and a 'thickness direction' thereof may be defined as a 'T' direction. The 'thickness direction' may be used as having the same concept as a direction in which dielectric layers are laminated, for example, a 'lamination direction.'

The ceramic body 100 may have a hexahedral shape or a similar shape, but the shape of the body 100 is not limited thereto.

The ceramic body 110 may include a first surface S1 and a second surface S2 disposed to oppose each other in a first direction, a third surface S3 and a fourth surface S4 connecting the first surface S1 and the second surface S2 and disposed to oppose each other in a second direction, and a fifth surface S5 and a sixth surface S6 connecting the first surface S1 to the fourth surface S4 and disposed to oppose each other in a third direction.

The first surface S1 and the second surface S2 are surfaces opposing to each other in the thickness direction of the ceramic body 110, the first direction. The third surface S3 and the fourth surface S4 may be defined as surfaces opposing each other in the length direction of the ceramic body 110, the second direction, and the fifth surface S5 and the sixth surface S6 may be defined as surfaces opposing to each other in the width direction of the ceramic body 110, the third direction.

The plurality of internal electrodes 121 and 122 disposed inside the ceramic body 110 may have ends exposed through the third surface S3 or the fourth surface S4.

The internal electrodes 121 and 122 may include a pair of a first electrode 121 and a second electrode 122.

One end of the first internal electrode 121 may be exposed through the third surface S3, and one end of the second internal electrode 122 may be exposed through the fourth surface S4.

The other end of the first internal electrode 121 and the other end of the second internal electrode 122 may be disposed at regular intervals from the fourth surface S4 or the third surface S3, which will be described in detail later.

The first and second external electrodes 131 and 132 may be provided on the third surface S3 and the fourth surface S4 of the ceramic body 110 to be electrically connected to the internal electrodes 121 and 122.

Each of the internal electrodes may have a thickness of, for example, 0.4 micrometer (μm) or less, but the thickness thereof is not limited thereto.

According to an exemplary embodiment, at least 200 dielectric layers each including an internal electrode disposed thereon may be laminated.

According to an exemplary embodiment, the ceramic body 110 may include a plurality of dielectric layers 111 laminated therein.

A plurality of dielectric layers 111 forming the ceramic body 110 are in a sintered state. Adjacent dielectric layers 111 may be integrated with each other such that boundaries therebetween may not be readily apparent.

The dielectric layer 111 may be formed by sintering a ceramic green sheet including a ceramic powder.

The ceramic powder is not limited as long as it is typically used in the art.

The ceramic powder may include, for example, a barium titanate ($BaTiO_3$)-based ceramic powder, but is not limited thereto.

The $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ or the like, in which some of calcium (Ca), zirconium (Zr), and the like are employed in $BaTiO_3$, but is not limited thereto.

The ceramic green sheet may include a transition metal, a rare earth element, magnesium (Mg), aluminum (Al), and the like, in addition to the ceramic powder.

A thickness of the dielectric layer 111 may appropriately vary depending on a capacitance design of a multilayer ceramic capacitor.

For example, the thickness of the dielectric layer 111 provided between two internal electrode layers adjacent to each other after being sintered may be 0.4 μm or less, but the thickness thereof is not limited thereto.

In an exemplary embodiment, the thickness of the dielectric layer 111 may refer to an average thickness.

An average thickness of the dielectric layer 111 may be measured by scanning a cross section in the length direction of the ceramic body 1110 using a scanning electronic microscope (SEM), as shown in FIG. 3.

For example, the average thickness may be obtained by measuring the thicknesses at 30 equidistant points in a length direction, on an image of any dielectric layer, extracted from the image obtained by scanning a cross section in length-thickness directions (L-T), cut in a central portion in a width direction W of the ceramic body 110 and averaging the measured thickness values.

The 30 equidistant points may be measured in a capacitance forming portion, a region in which the first and second internal electrodes 121 and 122 overlap each other.

If the measurement of average thickness is performed on up to ten or more dielectric layers, the average thickness of the dielectric layer may be further generalized.

The ceramic body 110 may include an active portion A as a portion contributing to formation of capacitance of a capacitor and a top cover portion C1 and a bottom cover portion C2, as a margin portion, respectively disposed above and below the active portion A.

The active portion A may be formed by repeatedly laminating the plurality of first and second internal electrodes 121 and 122 with the dielectric layer 111 interposed therebetween.

The top cover portion C1 and the bottom cover portion C2 may have the same material and structure as the dielectric layer 111, except that they do not include an internal electrode.

For example, the top cover portion C1 and the bottom cover portion C2 may include a ceramic material such as a barium titanate ($BaTiO_3$)-based ceramic material.

The top cover portion C1 and the bottom cover portion C2 may be formed by vertically laminating a single dielectric layer or two or more dielectric layers on top and bottom surfaces of the active portion A. The cover portion 112 may basically serve to prevent damage of an internal electrode caused by a physical or chemical stress.

Each of the top cover portion C1 and the bottom cover portion C2 may have a thickness of 20 μm or less, but the thickness thereof is not limited thereto.

With the recent trend toward high performance and light-weight, thinness, shortness, and small size of electronic devices, electronic components have also been required to have s small size, high performance, and ultrahigh capacitance. Accordingly, top and bottom cover portions disposed inside a ceramic body are decreasing in thickness.

In the case in which each of the first cover portion C1 and the bottom cover portion C2 has a thickness of 20 μm or less, external moisture and a plating solution may readily permeate through the thin cover portions C1 and C2 to increase probability of poor moisture-resistance reliability.

According to an exemplary embodiment, an external electrode may be multiply coated to prevent disconnection of an external electrode disposed on a corner portion of the ceramic body. Moreover, points having opposite slopes of tangents may be disposed in a certain area of an electrode layer and a plating layer disposed on top and bottom surface of the ceramic body to improve the moisture-resistance reliability.

For example, a feature of a high-capacitance micro multilayer ceramic capacitor according to exemplary embodiment is that an external electrode is multiply coated to improve moisture-resistance reliability when each of the upper cover portion C1 and the bottom cover portion C2 has a small thickness of 20 μm or less.

Accordingly, in a conventional multilayer ceramic capacitor in which a thickness of each of an upper cover portion C1 and a lower cover portion C2 is more than 20 μm, moisture-resistance reliability is not significantly problematic, by multiply coating an external electrode, similarly to an exemplary embodiment, although points having opposite slopes of tangents are not disposed in a certain area of an electrode layer and a plating layer disposed on top and bottom surface of the ceramic body.

The first and second internal electrodes 121 and 122 may be formed using a conductive paste containing at least one of, for example, silver (Ag), lead (Pb), platinum (Pt), nickel (Ni), and copper (Cu), but a material thereof is not limited thereto.

A multilayer ceramic capacitor according to an exemplary embodiment may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122 to form capacitance, and the second external electrode 132 may be connected to a potential different from a potential connected to the first external electrode 131.

The first and second external electrodes 131 and 132 may be disposed on the third surface S3 and the fourth surface S4 in the length direction that is the second direction of the ceramic body 110, respectively and may extend to the first surface S1 and the second surface S2 in the thickness direction that is the first direction of the ceramic body 110.

The external electrode 131 is disposed on an external surface of the ceramic body 111 and includes electrode layers 131a and 131b electrically connected to the internal electrodes 121 and plating layers 131c and 131d disposed on the electrode layers 131a and 131b. The external electrode 132 is disposed on another external surface of the ceramic body 111 and includes electrode layers 132a and 132b electrically connected to the internal electrodes 122 and plating layers 132c and 132d disposed on the electrode layers 132a and 132b.

The external electrodes 131 and 132 include a first external electrode 131 and a second external electrode 132 respectively disposed one side and the other side of the ceramic body 111.

The electrode layers 131a, 131b, 132a, and 132b may include a conductive metal and a glass.

A conductive metal used in the electrode layers 131a, 131b, 132a, and 132b is not limited as long as it may be electrically connected to the internal electrode to form capacitance. The conductive metal may be at least one selected from the group consisting of, for example, copper (Cu), silver (Ag), nickel (Ni), and alloys thereof.

The electrode layers 131a, 131b, 132a, and 132b may be formed by coating a conductive paste prepared by adding glass frit to the conductive metal powder and sintering the coated conductive paste.

For example, the electrode layers 131a, 131b, 132a, and 132b may be sintered electrodes formed by sintering a paste containing a conductive metal.

The conductive metal included in the electrode layers 131a, 131b, 132a, and 132b is electrically conducted to the first and second internal electrodes 121 and 122 to implement electrical characteristics.

The glass included in the electrode layers 131a, 131b, 132a, and 132b serve as a sealant with the conductive metal to block external moisture.

The first external electrode 131 is disposed one surface in the length direction L that is the second direction of the ceramic body 110 and includes first electrode layers 131a and 131b electrically connected to the first internal electrode 121 and first plating layers 131c and 131d disposed on the first electrode layers 131a and 131b.

The second external electrode 132 is disposed on the other surface in the length direction L that is the second direction of the ceramic body 110 and includes second electrode layers 132a and 132b electrically connected to the second internal electrode 122 and second plating layers 132c and 132d disposed on the second electrode layers 132a and 132b.

The electrode layers 131a, 131b, 132a, and 132b may be disposed on both side surfaces in the length direction L of the ceramic body 110 and may extend to portions of the first surface S1 and the second surface S2 that are a top surface and a bottom surface of the ceramic body 110.

Plating layers 131b, 131c, 132b, and 132c may be disposed above the electrode layers 131a, 131b, 132a, and 132b.

The electrode layers 131a, 131b, 132a, and 132b may be formed of the same conductive metal as the first and second internal electrodes 121 and 122, but a material thereof is not limited thereto. For example, the electrode layers 131a, 131b, 132a, and 132b may be formed of copper (Cu), silver (Ag), nickel (Ni) or alloys thereof.

The electrode layers 131a, 131b, 132a, and 132b may be disposed on the third surface S3 and the fourth surface S4 disposed to oppose each other in the second direction of the ceramic body 110, respectively, and may include first layers 131a and 132a electrically connected to the internal electrodes 121 and 122 and second layers 131b and 132b disposed on the first layers 131a and 132b in such a manner that widths, in the length direction, of the second layers 131b and 132b disposed on the first surface S1 and the second surface S2 are smaller than widths, in the length direction, of the first layers 131a and 132a.

The second layers 131b and 132b may cover corner portions of the ceramic body 110.

According to an exemplary embodiment, since the first layers 131a and 132a and the second layers 131b and 132b that are electrode layers cover the corner portions of the ceramic body 110, external moisture and plating solution may be prevented from permeating the corner portions of the ceramic body 110 by multiple coating. Thus, moisture-resistance reliability may be improved.

The plating layers 131c, 131d, 132c, and 132d may include nickel plating layers 131c and 132c and tin plating layers 131d and 132d disposed on the nickel plating layers 131c and 132c, but are not limited thereto.

The plating layers 131c, 131d, 132c, and 132d may cover end portions of the first layers 131a and 132a.

According to an exemplary embodiment, the electrode layers 131a, 131b, 132a, and 132b and plating layers 131c, 131d, 132c, and 132d extend to the first surface S1 and the second surface S2 of the ceramic body 110.

At least one point $I_P$, at which the slopes of the tangent lines of the electrode layers 131a and 132a and the plating layers 131c, 131d, 132c, and 132d are opposite to each other, is disposed in a region within a range of ±0.2 BW in the length direction around a point (0.5 BW) that is a halfway point of an overall width BW, in the length direction, of the electrode layers disposed on the first surface S1 or the second surface S2 of the ceramic body 110. At least one point $I_P$, a dimple, is disposed in a region within a range of ±0.2 BW in the length direction around a point (0.5 BW) that is a halfway point of an overall width BW, in the length direction, of the electrode layers disposed on the first surface S1 or the second surface S2 of the ceramic body 110.

The overall width BW of the electrode layers disposed on a first surface and a second surface of the ceramic body is a width, in the length direction, of the first layers 131a and 132a.

As mentioned above, at least one point $I_P$, at which the slopes of the tangent lines of the electrode layers 131a and 132a and the plating layers 131c, 131d, 132c, and 132d are opposite to each other, is disposed in a region within a range of ±0.2 BW around a point (0.5 BW) that is a halfway point of the overall width BW of the electrode layers disposed on the first surface S1 or the second the surface S2 of the ceramic body 110. Accordingly, there is no disconnection of an external electrode disposed on the corner portion of the ceramic body 110 and moisture-resistance characteristics may be enhanced to improve reliability.

The region within a range of ±0.2 BW around a point (0.5 BW) that is a halfway point of the overall width BW of the electrode layers disposed on the first surface S1 or the second surface S2 of the ceramic body 110 is a region occupying 40 percent of the overall width BW of the first layers 131a and 132a, as shown in FIG. 4, and may be designated by 0.4 BW.

There may be at least two points $I_P$, at which the slopes of the tangent lines of the electrode layers 131a and 132a and the plating layers 131c, 131d, 132c, and 132d are opposite to each other, in the region within a range of ±0.2 BW around the point (0.5 BW) that is a halfway point of the overall width BW of the electrode layers disposed on the first surface S1 or the second surface S2 of the ceramic body 110.

In a product to which a thin dielectric film and an internal electrode are applied (the dielectric layer 111 having a thickness of 0.4 μm or less and each of the first and second electrodes 121 and 122 having a thickness of 0.4 μm or less after being sintered), moisture-resistance reliability may be degraded.

Accordingly, when the dielectric layer 111 has a thickness of 0.4 μm or less and each of the first and second electrodes 121 and 122 has a thickness of 0.4 μm or less, an electrode layer should be multiply coated and at least one point $I_P$, at which the slopes of the tangent lines of the electrode layers 131a and 132a and the plating layers 131c, 131d, 132c, and 132d are opposite to each other, should be disposed in the region within a range of ±0.2 BW around the point (0.5 BW) that is a halfway point of the overall width BW of the electrode layers. Thus, degradation of the moisture-resistance reliability may be prevented.

The term "thin film" used herein means that a dielectric layer and an internal electrode have thicknesses smaller than thicknesses of a dielectric layer and an internal electrode of a conventional product, and also means that each of the dielectric layer 111 and the first and second internal electrodes 121 and 122 has a thickness of 0.4 μm or less.

In an exemplary embodiment, the point $I_P$ at which the slopes of the tangent lines of the electrode layers 131a and 132a and the plating layers 131c, 131d, 132c, and 132d are opposite to each other may be a point at which slopes of tangent lines changes from a negative value to a positive value.

For example, as shown in FIG. 4, a slope of tangent ST1 may have a negative value in a region previous from the point $I_P$ at which the slopes of the tangent lines of the electrode layers 131a and 132a and the plating layers 131c, 131d, 132c, and 132d are opposite to each other. After passing through the point $I_P$, a slope of tangent ST2 may have a positive value.

In an exemplary embodiment, at least one point $I_P$ at which the slopes of the tangent lines of the electrode layers 131a and 132a and the plating layers 131c, 131d, 132c, and 132d change from a negative value to a positive value is disposed in the region within a range of ±0.2 BW around the point (0.5 BW) that is a halfway point of the overall width BW of the electrode layers, among the electrode layers disposed on the first surface S1 or the second surface S2 of the ceramic body 110.

As a result, moisture-resistance reliability of a multilayer ceramic electronic component may be improved.

Hereinafter, a method of fabricating a multilayer ceramic capacitor according to an exemplary embodiment will be described below.

A plurality of ceramic green sheets may be prepared according to an exemplary embodiment.

To form the ceramic green sheet, a slurry may be prepared by mixing a ceramic powder, a binder, a solvent, and the like. The slurry may shaped be in the form a sheet having a thickness of several micrometers by a doctor blade technique. Then, the ceramic green sheet may be sintered to forma dielectric layer 111, as shown in FIG. 2.

The ceramic green sheet may have a thickness of 0.6 μm. Accordingly, after the sintering, the dielectric layer may have a thickness of 0.4 μm or less.

Next, a conductive paste for an internal electrode may be coated on the ceramic green sheet to form an internal electrode pattern. The internal electrode pattern may be formed by means of a screen printing method, a gravure printing method, or the like.

The conductive paste for an internal electrode may include a conductive metal and an additive, and the additive may at least one of a non-metal oxide and a metal oxide.

The conductive metal may include nickel. The additive may include barium titanate or strontium titanate as the metal oxide.

The internal electrode pattern may have a thickness of 0.5 μm or less. Accordingly, after the sintering, the internal electrode may have a thickness of 0.4 μm or less.

The ceramic green sheet, on which the internal electrode pattern is formed, may be laminated and may be pressurized in a laminated direction to be compressed to form a ceramic-laminated structure in which the internal electrode pattern is formed.

The ceramic-laminated structure may be cut in each region corresponding to a single capacitor to form chips.

In this case, the ceramic-laminated structure may be cut in such a manner that ends of internal electrode patterns are alternately exposed through side surfaces thereof.

The ceramic-laminated structure formed into chips may be sintered to form a ceramic body.

The sintering process may be performed in a reducing atmosphere. Additionally, the sintering process may be performed by controlling a temperature-increase speed. The temperature-rising speed may be 30° C./60 s to 50° C./60 s at 700° C. or less.

An external electrode may be formed to be electrically connected to an internal electrode exposed to a side surface of the ceramic body while covering the side surface of the ceramic body. A plating layer such as nickel, tin, or the like may be formed on a surface of the external electrode.

More specifically, a multilayer ceramic capacitor according to an exemplary embodiment was prepared through a method described below.

Barium titanate powder, ethanol as an organic solvent, and polyvinyl butyral as a binder were mixed and ball-milled to prepare ceramic slurry. A ceramic green sheet was prepared using the ceramic slurry.

A nickel-containing conductive paste for an internal electrode was printed on the ceramic green sheet to form an internal electrode. A green laminated structure with the internal electrode laminated was isostatically pressed at temperature of 85° C. and pressure of 1,000 kgf/cm$^2$.

The compressed green laminated structure was cut to form a green chip. The green chip was maintained in atmosphere at a temperature of 230° C. for 60 hours during a de-binding process. The green chip subjected to the de-binding process was sintered at temperature of 1,000° C. to form a sintered chip. The sintering process was performed in a reducing atmosphere to prevent oxidation of the internal electrode, and the reducing atmosphere was rendered to be $10^{-11}$ to $10^{-10}$ atm lower than an Ni/NiO equilibrium oxygen partial pressure.

An electrode layer was formed outwardly of the sintered chip using a paste for an external electrode including a copper powder and a glass powder. A nickel plating layer and a tin plating layer were formed on the electrode layer through electroplating.

A first layer was formed outwardly of the sintered chip using the paste for an external electrode including a copper powder and a glass powder. A second layer was formed on the first layer to have smaller width than the first layer in a length direction of the ceramic body, by using a paste for an external electrode including a copper powder and a glass powder similar to the copper powder and the glass powder of the first layer.

The electrode layer may be doubly coated on the first layer and the second layer to doubly form a sintered electrode layer in a corner portion of the ceramic body. Thus, an uncoated problem of external electrode on the corner portion of the ceramic body may be prevented to improve moisture-resistance reliability.

As described above, according to an exemplary embodiment, an external electrode is multiply coated. Thus, there is no disconnection of an external electrode disposed on a corner portion of a ceramic body. Further, a point at which slopes of tangent lines are opposite to each other is disposed in a certain region of an electrode layer and a plating layer disposed on a top surface and a bottom surface of the ceramic body. Thus, moisture-resistance characteristics may be enhanced to improve reliability.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and a plurality of internal electrodes disposed to face each other with the dielectric layers interposed therebetween, the ceramic body having a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and
an external electrode disposed on external surfaces of the ceramic body and electrically connected to the internal electrodes,
wherein the external electrode includes electrode layers electrically connected to the internal electrodes, and plating layers disposed on the electrode layers, and the electrode layers and the plating layers extend to the first surface and the second surface of the ceramic body, and
at least one point, at which slopes of tangent lines of one of the electrode layers and the plating layers are opposite to each other, is disposed in a region within a range of ±0.2 BW around a point (0.5 BW) that is a halfway point of an overall width BW of the electrode layers disposed on the first surface or the second surface of the ceramic body.

2. The multilayer ceramic electronic component of claim 1, wherein the electrode layers are disposed on one of the third surface and the fourth surface, and include a first layer electrically connected to the internal electrodes and a second layer disposed on the first layer in such a manner that a width of the second layer disposed on the first surface or the second surface of the ceramic body is smaller than a width of the first layer disposed thereon.

3. The multilayer ceramic electronic component of claim 2, wherein the overall width BW of the electrode layers disposed on the first surface and the second surfaces of the ceramic body is the width of the first layer.

4. The multilayer ceramic electronic component of claim 2, wherein the plating layers cover end portions of the first layer.

5. The multilayer ceramic electronic component of claim 2, wherein the second layer covers a corner portion of the ceramic body.

6. The multilayer ceramic electronic component of claim 2, wherein the width of the second layer disposed on the first surface or the second surface of the ceramic body is a width, in the second direction, of the second layer disposed on the first surface or the second surface of the ceramic body, and
the width of the first layer disposed on the first surface or the second surface of the ceramic body is a width, in the second direction, of the first layer disposed on the first surface or the second surface of the ceramic body.

7. The multilayer ceramic electronic component of claim 1, wherein each of the dielectric layers has a thickness of 0.4 micrometer or less and each of the internal electrodes has a thickness of 0.4 micrometer or less.

8. The multilayer ceramic electronic component of claim 1, wherein the ceramic body includes an active portion in which capacitance is formed by including the plurality of internal electrodes disposed to oppose each other with the dielectric layers interposed therebetween, and cover portions disposed above and below the active portion, and
a thickness of each of the cover portions is 20 micrometers or less.

9. The multilayer ceramic electronic component of claim 1, wherein the point at which the slopes of the tangent lines of the one of the electrode layers and the plating layers are opposite to each other is a point at which slopes of tangent lines change from a negative value to a positive value.

10. The multilayer ceramic electronic component of claim 1, wherein the at least one point is disposed in the region within the range of ±0.2 BW, in the second direction, around a point (0.5 BW) that is a halfway point of the overall width BW, in the second direction, of the electrode layers disposed on the first surface or the second surface of the ceramic body.

11. The multilayer ceramic electronic component of claim 1, wherein the electrode layers include a conductive metal and a glass.

12. The multilayer ceramic electronic component of claim 1, wherein the plating layers include a nickel plating layer and a tin plating layer.

13. A multilayer ceramic electronic component comprising:
a ceramic body including dielectric layers and first and second internal electrodes disposed to face each other with the dielectric layers interposed therebetween, the ceramic body having a first surface and a second surface opposing each other in a first direction, a third surface and a fourth surface connected to the first surface and the second surface and opposing each other in a second direction, and a fifth surface and a sixth surface connected to the first surface to the fourth surface and opposing each other in a third direction; and
an external electrode including a first electrode layer in contact with the first internal electrodes, a second electrode layer disposed on the first electrode layer and exposing an end portion of the first electrode layer, and first and second plating layers disposed on the first and second electrode layers,
wherein the first and second electrode layers and the first and second plating layers extend from the third surface to the first surface and the second surface of the ceramic body, and
at least one of the first electrode layer and the first and second plating layers has a dimple in a region within a range of ±0.2 BW, in the second direction, around a point (0.5 BW) that is a halfway point of an overall width BW, in the second direction, of the first electrode layer disposed on the first surface or the second surface of the ceramic body.

14. The multilayer ceramic electronic component of claim 13, wherein the first and second plating layers cover end portions of the first electrode layer.

15. The multilayer ceramic electronic component of claim 13, wherein the first and second electrode layer cover a corner portion of the ceramic body.

16. The multilayer ceramic electronic component of claim 13, wherein each of the dielectric layers has a thickness of 0.4 micrometer or less and each of the first and second internal electrodes has a thickness of 0.4 micrometer or less.

17. The multilayer ceramic electronic component of claim 13, wherein the ceramic body includes an active portion in which capacitance is formed by including the first and second internal electrodes disposed to oppose each other with the dielectric layers interposed therebetween, and cover portions disposed above and below the active portion, and
a thickness of each of the cover portions is 20 micrometers or less.

18. The multilayer ceramic electronic component of claim 13, wherein the electrode layers include a conductive metal and a glass.

19. The multilayer ceramic electronic component of claim 13, wherein the plating layers include a nickel plating layer and a tin plating layer.

\* \* \* \* \*